United States Patent
Lee et al.

(10) Patent No.: US 10,067,528 B2
(45) Date of Patent: Sep. 4, 2018

(54) FOLDABLE DISPLAY DEVICE AND METHOD OF OPERATING THE SAME

(71) Applicant: Samsung Display Co., Ltd., Yongin-si, Gyeonggi-do (KR)

(72) Inventors: Jaeseob Lee, Yongin-si (KR); Youngshin Pyo, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/189,880

(22) Filed: Jun. 22, 2016

(65) Prior Publication Data
US 2017/0064879 A1  Mar. 2, 2017

(30) Foreign Application Priority Data
Aug. 24, 2015  (KR) .......................... 10-2015-0118879

(51) Int. Cl.
*G06F 1/16* (2006.01)

(52) U.S. Cl.
CPC ...................................... *G06F 1/16* (2013.01)

(58) Field of Classification Search
None
See application file for complete search history.

(56) References Cited

U.S. PATENT DOCUMENTS

| | | | |
|---|---|---|---|
| 6,084,217 A | 7/2000 | Bulgajewski | |
| 9,535,550 B2 * | 1/2017 | Levesque | G06F 3/0487 |
| 2005/0142317 A1 * | 6/2005 | Clovesko | B32B 9/00 428/40.1 |
| 2005/0198875 A1 * | 9/2005 | Herrin | G09F 21/02 40/124.13 |
| 2006/0038745 A1 * | 2/2006 | Naksen | G06F 1/1624 345/30 |
| 2010/0246103 A1 * | 9/2010 | Visser | G06F 1/1616 361/679.01 |
| 2011/0157536 A1 * | 6/2011 | Inui | H05K 1/0281 349/151 |
| 2012/0308816 A1 * | 12/2012 | Kohama | B32B 15/08 428/354 |
| 2013/0049645 A1 * | 2/2013 | Lim | G09G 3/001 318/116 |
| 2014/0016048 A1 * | 1/2014 | Omote | G06F 3/044 349/12 |

(Continued)

FOREIGN PATENT DOCUMENTS

| | | |
|---|---|---|
| JP | 2000-040865 A | 2/2000 |
| JP | 2000-150114 A | 5/2000 |

(Continued)

*Primary Examiner* — Xanthia C Cunningham
(74) *Attorney, Agent, or Firm* — Knobbe Martens Olson & Bear LLP

(57) ABSTRACT

A foldable display device and a method of operating the same are disclosed. In one aspect, the foldable display device includes a flexible display panel that is foldable and a heating element that provides heat to a folding portion of the flexible display panel. According to some embodiments, the foldable display device can minimize or prevent exfoliation of a protection film from the folding portion of the flexible display panel, and thus, the quality of a product using the foldable display device can be stabilized.

18 Claims, 5 Drawing Sheets

(56) References Cited

U.S. PATENT DOCUMENTS

| | | | |
|---|---|---|---|
| 2014/0155239 A1* | 6/2014 | Walsh | B31B 1/00 493/128 |
| 2014/0300529 A1 | 10/2014 | Kim et al. | |
| 2014/0320396 A1* | 10/2014 | Modarres | G06F 3/0412 345/156 |
| 2014/0328041 A1* | 11/2014 | Rothkopf | H04M 1/0216 361/807 |
| 2014/0355195 A1 | 12/2014 | Kee et al. | |
| 2015/0049428 A1 | 2/2015 | Lee et al. | |
| 2015/0207102 A1* | 7/2015 | Jeong | H04M 1/0268 257/40 |
| 2015/0212548 A1* | 7/2015 | Namkung | G06F 1/1652 345/174 |
| 2015/0227172 A1* | 8/2015 | Namkung | G06F 1/1652 345/173 |
| 2015/0253884 A1* | 9/2015 | Hwang | G06F 3/041 345/173 |
| 2015/0382446 A1* | 12/2015 | Kwon | H05K 1/028 174/251 |
| 2016/0048363 A1* | 2/2016 | North | G06F 1/1616 345/1.1 |
| 2016/0062412 A1* | 3/2016 | Park | G06F 1/1616 361/679.27 |
| 2016/0088908 A1* | 3/2016 | Rowland | A44C 3/001 40/1.5 |
| 2016/0222165 A1* | 8/2016 | Wakita | G02B 5/20 |
| 2016/0255713 A1* | 9/2016 | Kim | G06F 1/1652 361/749 |
| 2017/0139511 A1* | 5/2017 | Ohsawa | G06F 3/045 |
| 2017/0190910 A1* | 7/2017 | Uno | C08L 79/08 |

FOREIGN PATENT DOCUMENTS

| | | |
|---|---|---|
| JP | 2000-223864 A | 8/2000 |
| JP | 2015-089910 A | 5/2015 |
| KR | 10-2014-0120585 A | 10/2014 |
| KR | 10-2014-0142004 A | 12/2014 |
| KR | 10-2015-0021167 A | 3/2015 |

* cited by examiner

FOLDABLE DISPLAY DEVICE AND METHOD OF OPERATING THE SAME

CROSS-REFERENCE TO RELATED APPLICATION

This application claims the benefit of Korean Patent Application No. 10-2015-0118879, filed on Aug. 24, 2015, in the Korean Intellectual Property Office, the disclosure of which is incorporated herein in its entirety by reference.

BACKGROUND

Field

The described technology generally relates to a foldable display device and a method of operating the same.

Description of the Related Technology

A flat panel display such as an organic light-emitting diode (OLED display can be flexibly deformed and thus can have a foldable structure for the purpose of portability. While OLED technology is of recent interest, other self-emissive technologies (i.e., no backlight) could be the subject of a flexible display.

SUMMARY OF CERTAIN INVENTIVE ASPECTS

One inventive aspect relates to a foldable display device having a foldable main body.

Another aspect is a foldable display device and a method of operating the foldable display by folding and unfolding the same.

Another aspect is a foldable display device that includes: a flexible display panel that is foldable; and a heating unit configured to heat a folding portion of the flexible display panel.

The heating unit may include: a heating pad included in the folding portion; and a heating wire aligned within the heating pad and generating heat when electricity flows in the heating wire.

The heating wire may have a zigzag pattern.

The heating wire may have a diagonal pattern.

The heating wire may have a circular pattern.

The foldable display device may further include: a sensor configured to detect whether the flexible display panel is folded or unfolded; and a controller configured to make a current flow in the heating wire when the flexible display panel is switched from a folding state to an unfolding state in connection with the sensor.

The flexible display panel may include a display layer for producing an image and a protection film arranged on a surface of the display layer, and the heating unit may be arranged on the protection film.

The flexible display panel may further include a window arranged in a direction in which a user views an image, wherein the window is arranged opposite to the protection film with the display layer between the window and the protection film.

The flexible display panel may be folded in a direction in which tensile stress is applied to the protection film and compressive stress is applied to the window.

The foldable display device may further include a touch screen panel and a polarization layer between the display layer and the window.

Adhesion layers may be arranged between respective layers of the flexible display panel including the protection film, the display layer, the touch screen panel, the polarization layer, and the window.

The protection film may include a polyimide material.

Another aspect is a method of operating a foldable display device, that includes: preparing the foldable display device including a flexible display panel that is foldable and a heating unit configured to heat a folding portion of the flexible display panel; and heating the folding portion by the heating unit when the flexible display panel is switched to a folding state to an unfolding state.

The heating unit may include a heating pad included in the folding portion and heating wires aligned in the heating pad and generating heat when electricity flows in the heating wires, and the heating wires may generate heat when the electricity flows in the heating wires and when the flexible display panel is switched to the folding state to the unfolding state.

The flexible display panel may include a display layer for producing an image and a protection film adhering to a surface of the display layer, and the heating unit may be configured to heat the protection film when the flexible display panel is switched to the folding state to the unfolding state.

The flexible display panel may further include a window arranged in a direction in which a user views an image, wherein the window is arranged opposite to the protection film with the display layer between the window and the protection film, and the flexible display panel may be folded in a direction in which tensile stress is applied to the protection film and compressive stress is applied to the window.

A touch screen panel and a polarization layer may be further included between the display layer and the window, and adhesion layers may be arranged between respective layers of the flexible display panel comprising the protection film, the display layer, the touch screen panel, the polarization layer, and the window.

The protection film may include a polyimide material.

The heating unit may be configured to heat the protection film including the polyimide material at a temperature between about 40° C. and about 60° C. when the flexible display panel is unfolded.

Another aspect is a foldable display device comprising: a flexible display panel that is foldable; and a heating element that provides heat to a folding portion of the flexible display panel.

In the above display device, the heating element comprises: a heating pad placed in the folding portion; and a heating wire aligned within the heating pad and configured to generate heat when current flows through the heating wire. In the above display device, the heating wire has one of the following patterns: a zigzag pattern, a diagonal pattern and a circular pattern.

The above display device further comprises: a sensor configured to detect whether the flexible display panel is folded or unfolded; and a controller configured to make a current flow in the heating wire when the flexible display panel is switched from a folding state to an unfolding state in connection with the sensor. In the above display device, the flexible display panel comprises a display layer configured to display an image and a protection film arranged on a surface of the display layer, and wherein the heating element is arranged on the protection film.

In the above display device, the flexible display panel further comprises a window arranged in a direction in which a user views an image, and wherein the window is arranged opposite to the protection film with the display layer interposed between the window and the protection film. In the above display device, the flexible display panel is configured to be folded in a direction in which tensile stress is applied to the protection film and compressive stress is applied to the window. The above display device further comprises a touch screen panel and a polarization layer interposed between the display layer and the window. The above display device further comprises a plurality of adhesion layers arranged between respective layers of the flexible display panel comprising the protection film, the display layer, the touch screen panel, the polarization layer, and the window. In the above display device, the protection film is formed of a polyimide material.

Another aspect is a method of operating a foldable display device, the method comprising: preparing the foldable display device comprising a flexible display panel that is foldable and a heating element that provides heat to a folding portion of the flexible display panel; and heating the folding portion with the heating element when the flexible display panel is switched from a folding state to an unfolding state.

In the above display device, the heating element comprises a heating pad placed in the folding portion and a plurality of heating wires aligned in the heating pad and generating heat when electricity flows in the heating wires, and wherein the heating wires generate heat when the electricity flows in the heating wires and when the flexible display panel is switched from the folding state to the unfolding state.

In the above method, the flexible display panel comprises a display layer configured to display an image and a protection film adhering to a surface of the display layer, and wherein the heating element is configured to heat the protection film when the flexible display panel is switched from the folding state to the unfolding state. In the above method, the flexible display panel further comprises a window arranged in a direction in which a user views an image, and wherein the window is arranged opposite to the protection film with the display layer interposed between the window and the protection film, and wherein the flexible display panel is folded in a direction in which tensile stress is applied to the protection film and compressive stress is applied to the window.

The above method further comprises a plurality of a touch screen panel and a polarization layer placed between the display layer and the window, and wherein adhesion layers are arranged between respective layers of the flexible display panel comprising the protection film, the display layer, the touch screen panel, the polarization layer, and the window. In the above method, the protection film comprises a polyimide material. In the above method, the heating element is configured to heat the protection film at a temperature between about 40° C. and about 60° C. when the flexible display panel is unfolded.

Another aspect is a foldable display device comprising: a foldable display panel configured to be folded at a folding portion thereof; and a heater configured to heat the folding portion of the flexible display panel, wherein the heater is further configured to be folded together with the folding portion of the flexible display panel.

In the above display device, the heater comprises: a heating pad placed in the folding portion; and a heating wire aligned within the heating pad and configured to generate heat when electricity flows in the heating wire. In the above display device, the heating wire has one of the following patterns: a zigzag pattern, a diagonal pattern and a circular pattern.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Figure 1:
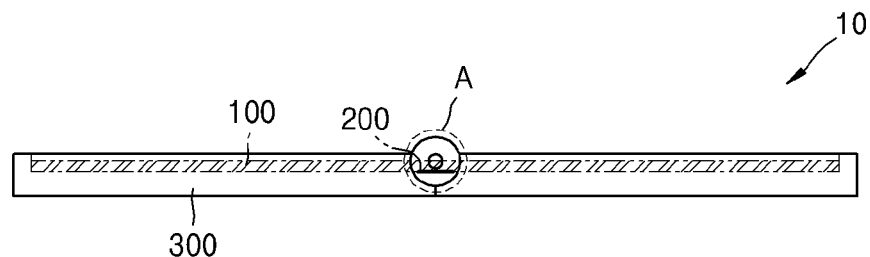
FIG. 1 illustrates an unfolding state of a foldable display device according to an exemplary embodiment.

As the inventive concept allows for various changes and numerous exemplary embodiments, particular exemplary embodiments will be illustrated in the drawings and described in detail in the written description. The attached drawings for illustrating exemplary embodiments of the inventive concept are referred to in order to gain a sufficient understanding of the inventive concept, the merits thereof, and the objectives accomplished by the implementation of the inventive concept. The inventive concept may, however, be embodied in many different forms and should not be construed as being limited to the exemplary embodiments set forth herein.

Hereinafter, embodiments will be described in detail with reference to the attached drawings. Like reference numerals in the drawings denote like elements, and thus their description will be omitted.

As used herein, the singular forms "a", "an" and "the" are intended to include the plural forms as well, unless the context clearly indicates otherwise.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Figure 2:
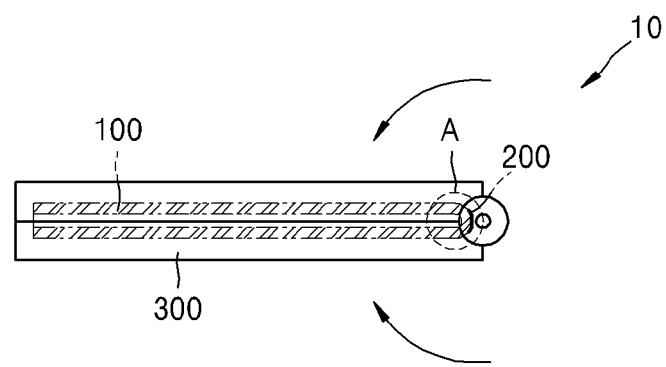
FIG. 2 illustrates a folding state of the foldable display device of FIG. 1.

FIGS. 1 and 2 respectively illustrate an unfolding state and a folding state of a foldable display device 10 according to one or more exemplary embodiments.

The foldable display device 10 includes a flexible display panel 100 that may be flexibly bent. In general, the flexible display panel 100 includes a display layer 120 (refer to FIG.

3) that has a stack structure in which a thin film transistor for producing an image on a flexible substrate, light-emitting devices, an encapsulation layer for covering and protecting the same, or the like are stacked. Since the flexible display panel 100 includes the flexible substrate instead of a rigid glass substrate, the foldable display panel 100 may be freely folded and unfolded within a flexibility range. Therefore, in the folding state, the flexible display panel 100 may be folded as illustrated in FIG. 2.

As illustrated in FIGS. 1 and 2, the flexible display panel 100 may be supported by a case 300 such that the flexible display panel 100 may be folded and unfolded, and when the case 300 rotates, the flexible display panel 100 may be folded or unfolded. Between both surfaces of the flexible display panel 100, a surface in a direction in which a user views an image, for example, a top surface of the flexible display panel 100 of FIG. 1, will be referred to as a front surface, and a surface in an opposite direction, that is, a surface facing the case 300, will be referred to as a rear surface.

However, when the flexible display panel 100 is repeatedly folded and unfolded, compressive stress and tensile stress are applied to a folding portion A of the flexible display panel 100.

Compressive stress and tensile stress are applied to a folding portion A of the flexible display panel 100 that is repeatedly folded or unfolded. That is, as illustrated in FIG. 2, when the flexible display panel 100 is folded, the compressive stress is applied to the front surface of the folding portion A, and the tensile stress is applied to the rear surface of the folding portion A. Since stresses are applied in different directions, one or more layers forming the flexible display panel 100 may exfoliate. For example, since the greatest tensile stress is applied to a protection film 110 (refer to FIG. 3) arranged on an outermost region of the rear surface, the protection film 110 may be highly likely to exfoliate when the flexible display panel 100 is repeatedly folded and unfolded without proper measures to prevent the flexible display panel 100 from repeatedly being folded and unfolded. In order to prevent the exfoliation of the protection film 110, a heating unit, heating element or heater 200 is arranged on a rear surface of the folding portion A of the flexible display panel 100. When the heating unit 200 properly operates, the exfoliation of the protection film 110 can be minimized or prevented.

Figure 3:
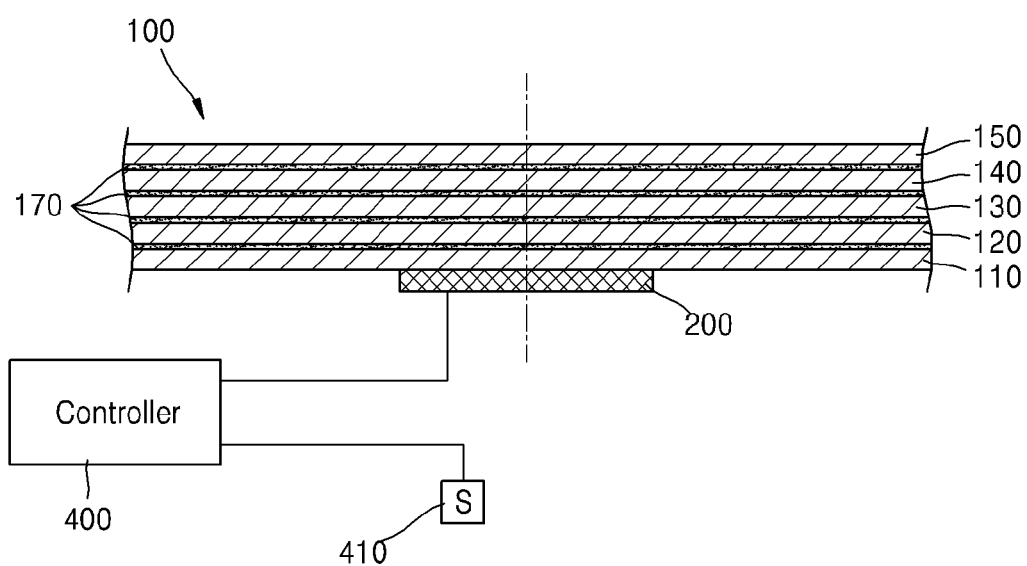
FIG. 3 illustrates a schematic stack structure of a flexible display panel and a heating pad of the foldable display device of FIG. 1.

Referring to FIG. 3, the stack structure of the flexible display panel 100 will be described below. The flexible display panel 100 includes the display layer 120 for producing an image, and the protection film 110 that adheres to a rear surface of the display layer 120. A touch screen panel 130, a polarization layer 140, and a window 150 are sequentially stacked in this order on a front surface of the display layer 120, and adhesion layers 170 are arranged between respective layers of the flexible display panel 100.

When the flexible display panel 100 having the above structure is folded as illustrated in FIG. 2, the greatest tensile stress is applied to the protection film 110 that is arranged on the outermost region such that the protection film 110 is elastically stretched. When the flexible display panel 100 is unfolded again as illustrated in FIG. 1, the protection film 110 that has been elastically stretched needs to quickly contract. However, if the protection film 110 does not contract enough, the protection film is likely to exfoliate. For example, if the protection film 110 does not quickly contract, the tensile stress keeps being applied to the protection film 110 of the folding portion A even though the flexible display panel 100 is unfolded. Thus, the protection film 110 easily exfoliates.

However, when the flexible display panel 100 is unfolded again, if the folding portion A of the flexible display panel 100 is heated by the heating unit 200, the protection film 110 quickly contracts, and thus, the exfoliation of the protection film 110 may be prevented. The protection film 110 includes a polyimide material, and if the protection film 110 is heated at a temperature between about 40° C. and about 60° C., the protection film 110 tends to quickly contract. Therefore, when the flexible display panel 100 is unfolded, if the heating unit 200 operates to heat the protection film 110 of the folding portion A at a temperature between about 40° C. and about 60° C., the protection film 110 quickly contracts, and thus, a risk of the exfoliation of the protection film 110 is greatly reduced. However, depending on the embodiment, the heating unit 200 can heat the protection film 110 of the folding portion A at a temperature less than about 40° C. or greater than about 60° C.

Figure 4A:
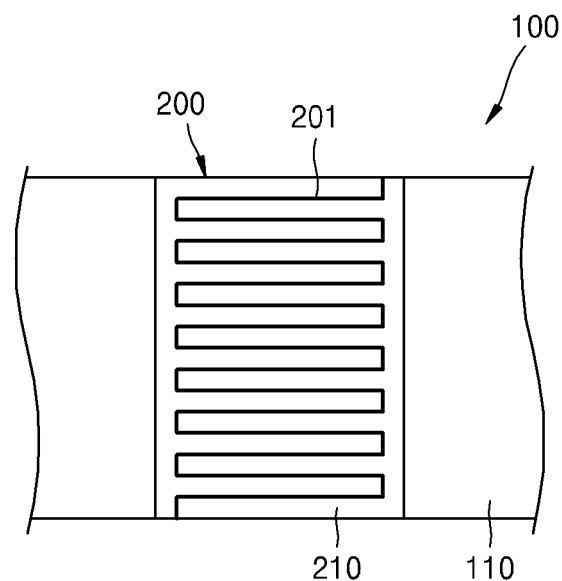
FIGS. 4a to 4c illustrate alignment examples of heating wires in heating pad of FIG. 3.
Figure 4B:
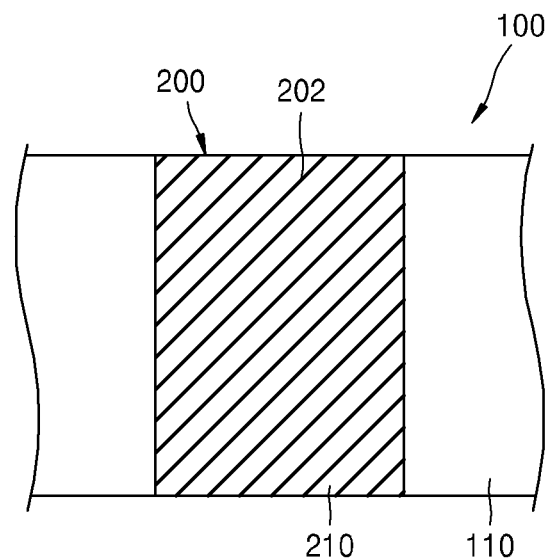
Figure 4C:
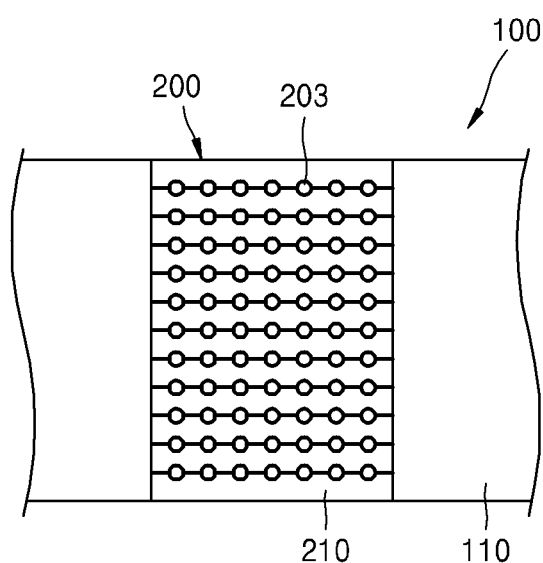

As illustrated in FIGS. 4a to 4c, the heating unit 200 includes a heating pad 210 that adheres to the protection film 110, and heating wires 201, 202, and 203 aligned in the heating pad 210. The heating wires 201, 202, and 203 may have various alignment patterns, for example, a zigzag pattern 201, a diagonal pattern 202, a circular pattern 203, or the like. When a controller 400 allows a current to flow in the heating wires 201, 202, and 203, the heating wires 201, 202, and 203 generate heat and thus heat the protection film 110 that adheres to the heating pad 210. The reference numeral 410 indicates a sensor that detects folding and unfolding states of the foldable display device. For example, the sensor may be an angle sensor, a proximity sensor, or the like.

A method of operating the foldable display device to fold and unfold the same by using the heating unit 200 will be described later. An internal structure of the display layer 120 of the flexible display panel 100 that is foldable will be briefly described.

Figure 6:
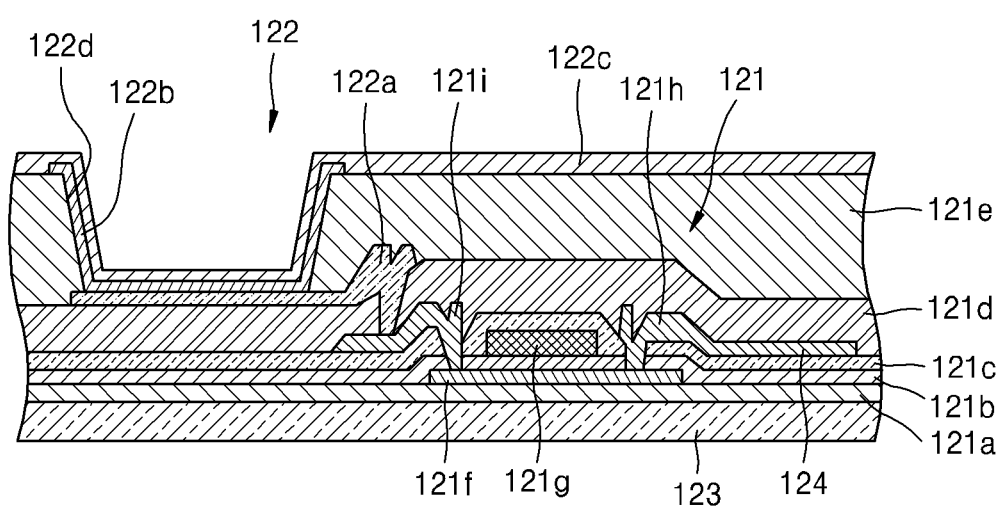
FIG. 6 illustrates a detailed structure of a display layer of the flexible display panel of FIG. 3.

As illustrated in FIG. 6, the display layer 120 includes a thin film transistor 121 and an organic light-emitting device 122. With regard to a structure of the thin film transistor 121, an active layer 121f is formed above a buffer layer 121a that is adjacent to a flexible substrate 123, and the active layer 121f has source and drain areas doped with highly concentrated N-type or P-type impurities. The active layer 121f may include an oxide semiconductor. For example, the oxide semiconductor may include Groups 12, 13, and 14 metal atoms such as zinc (Zn), indium (In), gallium (Ca), tin (Sn), cadmium (Cd), germanium (Ge), and hafnium (Hf), and an oxide including a material selected from a combination thereof. For example, the active layer 121f may include G-I-Z-O[$(In_2O_3)a(Ga_2O_3)b(ZnO)c$] (where, a, b, and c are real numbers satisfying conditions a≥0, b≥0, and c>0). A gate electrode 121g is formed above the active layer 121f with a gate insulating layer 121b therebetween. A source electrode 121h and a drain electrode 121i are formed above the gate electrode 121g. Interlayer insulating layers 121c are formed between the gate electrode 121g, the source electrode 121h, and the drain electrode 121i, and passivation layers 121d are formed between the source and drain electrodes 121h and 121i and an anode electrode 122a of the organic light-emitting device 122.

An insulating planarization layer 121e includes acryl, etc. above the anode electrode 122a, and after a predetermined opening 122d is formed in the planarization layer 121e, the organic light-emitting device 122 is formed.

The organic light-emitting device 122 emits red, green, and blue light according to flow of a current and displays predetermined image information. The organic light-emitting device 122 includes the anode electrode 122a that is connected to the drain electrode 121i of the thin film transistor 121 and receives positive power from the drain electrode 121i, a cathode electrode 122c that covers all pixels and provides negative power, and an emission layer 122b that is arranged between the anode electrode 122a and the cathode electrode 122c and emits light.

A hole injection layer (HIL), a hole transport layer (HTL), an electron transport layer (ETL), an electron injection layer (EIL), etc. may be stacked adjacent to the emission layer 122b.

For reference, the emission layer 122b may be formed in each pixel such that pixels respectively emitting red light, green light, and blue light are gathered to form one unit pixel. Alternatively, regardless of locations of the pixels, an emission layer may be formed over an entire pixel area. In this case, the emission layer may be formed when layers including emission materials that emit red light, green light, and blue light are vertically stacked or are combined. If an emission material emits white light, other colors may be combined. Also, a color conversion layer or a color filter for converting the emitted white light to another color of light may be further included.

A thin film encapsulation layer (not shown) in which organic layers and inorganic layers are alternately stacked may be formed above the cathode electrode 122c.

The flexible display panel 100 including the display layer 120 having the above-described structure may be flexibly deformed and thus may folded or unfolded as a user folds or unfolds the flexible display panel 100.

The foldable display device having the structure above may operate as follows.

Figure 5A:
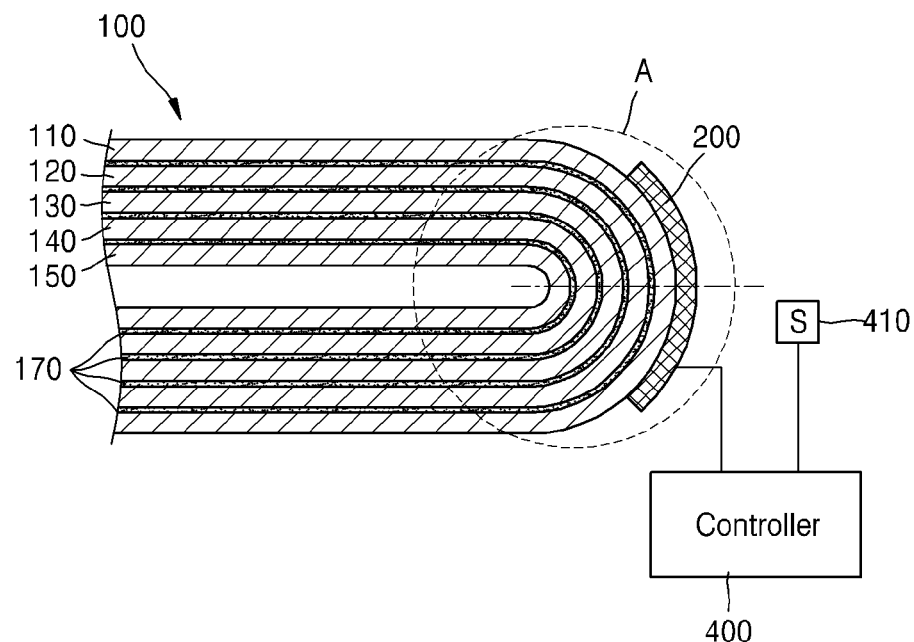
FIG. 5a illustrates a folding state of the flexible display panel of FIG. 3.

First of all, when the foldable display device is stored or moved, the flexible display panel 100 is folded as illustrated in FIG. 5A, and accordingly, stress is applied to the folding portion A of the flexible display panel 100. For example, the greatest tensile stress is applied to the protection film 110 that is arranged on the outermost region, and the protection film 110 is elastically stretched.

Figure 5B:
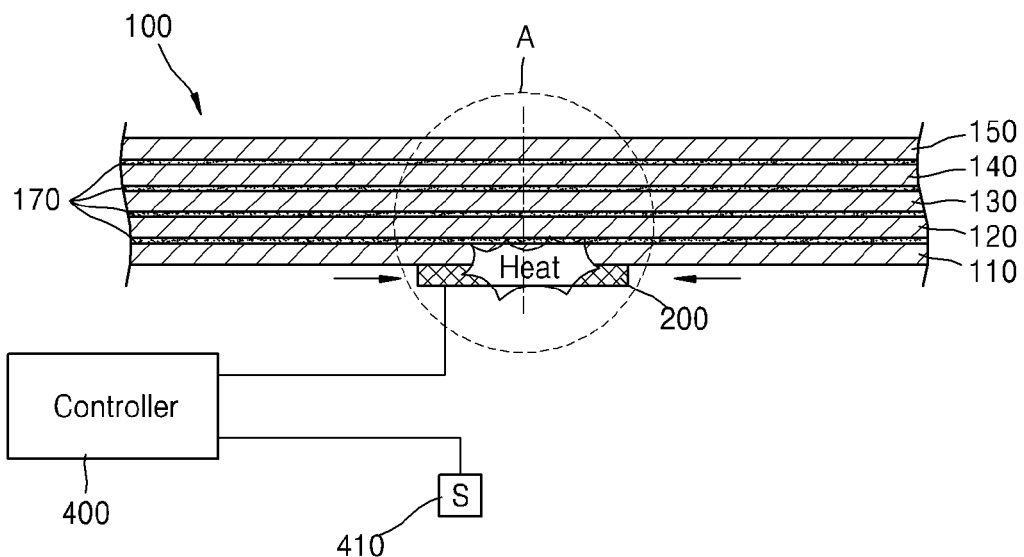
FIG. 5b illustrates an unfolding state of the flexible display panel of FIG. 3.

When the user views an image by unfolding the foldable display device, the flexible display panel 100 is straightly unfolded as illustrated in FIG. 5B. In this case, when a sensor 410 detects that the flexible display panel 100 that has been folded starts being unfolded, a controller 400 provides a current to the heating wires 201, 202, and 203 for about 4 to about 6 seconds in order to generate heat. Then, the protection film 110 that adheres to the heating pad 210 of the heating unit 200 is heated at a temperature from about 40° C. to about 60° C. and quickly contracts.

Therefore, the user may view an image on the front surface of the flexible display panel 100 that is straightly unfolded, and since the protection film 110 remains stably contracted, the protection film 110 may not exfoliate.

In the present exemplary embodiment, the heating unit 200 is formed on the folding portion A of the flexible display device 100. However, the heating unit 200 may be formed over the entire protection film 110. Also, in the present exemplary embodiment, the heating unit 200 directly adheres onto the protection film 110. However, if another layer between the heating unit 200 and the protection film 110 may instead deliver heat, the exfoliation of the protection film 110 may be sufficiently prevented.

Therefore, the above-described foldable display device can minimize or prevent exfoliation of the protection film from the folding portion of the flexible display panel even though the foldable display device is repeatedly folded and unfolded, and thus, the quality of a product using the foldable display device can be stabilized.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:
1. A foldable display device comprising:
a flexible display panel that is foldable; and
a heating element that provides heat to and is placed only on a folding portion of the flexible display panel,
wherein the heating element comprises:
a heating pad placed in the folding portion; and
a heating wire aligned within the heating pad and configured to generate heat when current flows through the heating wire.

2. The foldable display device of claim 1, wherein the heating wire has one of the following patterns: a zigzag pattern, a diagonal pattern and a circular pattern.

3. The foldable display device of claim 1, further comprising:
a sensor configured to detect whether the flexible display panel is folded or unfolded; and
a controller configured to make a current flow in the heating wire when the flexible display panel is switched from a folding state to an unfolding state in connection with the sensor.

4. The foldable display device of claim 1, wherein the flexible display panel comprises a display layer configured to display an image and a protection film arranged on a surface of the display layer, and wherein the heating element is arranged on the protection film.

5. The foldable display device of claim 4, wherein the flexible display panel further comprises a window arranged in a direction in which a user views an image, and wherein the window is arranged opposite to the protection film with the display layer interposed between the window and the protection film.

6. The foldable display device of claim 5, wherein the flexible display panel is configured to be folded in a direction in which tensile stress is applied to the protection film and compressive stress is applied to the window.

7. The foldable display device of claim 5, further comprising a touch screen panel and a polarization layer interposed between the display layer and the window.

8. The foldable display device of claim 7, further comprising a plurality of adhesion layers arranged between respective layers of the flexible display panel comprising the protection film, the display layer, the touch screen panel, the polarization layer, and the window.

9. The foldable display device of claim 4, wherein the protection film is formed of a polyimide material.

10. The foldable display device of claim 1, wherein the entirety of the heating element is configured to be folded with the folding portion of the flexible display panel.

11. A method of operating a foldable display device, the method comprising:

preparing the foldable display device comprising a flexible display panel that is foldable and a heating element that provides heat to and is placed only on a folding portion of the flexible display panel; and heating the folding portion with the heating element when the flexible display panel is switched from a folding state to an unfolding state, wherein the heating element comprises a heating pad placed in the folding portion and a plurality of heating wires aligned in the heating pad and generating heat when electricity flows in the heating wires, and wherein the heating wires generate heat when the electricity flows in the heating wires and when the flexible display panel is switched from the folding state to the unfolding state.

12. The method of claim 11, wherein the flexible display panel comprises a display layer configured to display an image and a protection film adhering to a surface of the display layer, and wherein the heating element is configured to heat the protection film when the flexible display panel is switched from the folding state to the unfolding state.

13. The method of claim 12, wherein the flexible display panel further comprises a window arranged in a direction in which a user views an image, and wherein the window is arranged opposite to the protection film with the display layer interposed between the window and the protection film, and wherein the flexible display panel is folded in a direction in which tensile stress is applied to the protection film and compressive stress is applied to the window.

14. The method of claim 13, further comprising a plurality of a touch screen panel and a polarization layer placed between the display layer and the window, and wherein adhesion layers are arranged between respective layers of the flexible display panel comprising the protection film, the display layer, the touch screen panel, the polarization layer, and the window.

15. The method of claim 12, wherein the protection film comprises a polyimide material.

16. The method of claim 15, wherein the heating element is configured to heat the protection film at a temperature between about 40° C. and about 60° C. when the flexible display panel is unfolded.

17. A foldable display device comprising:

a foldable display panel configured to be folded at a folding portion thereof; and a heater placed only on the folding portion and configured to heat the folding portion of the flexible display panel, wherein the heater is further configured to be folded together with the folding portion of the flexible display panel, wherein the heater comprises:

a heating pad placed in the folding portion; and a heating wire aligned within the heating pad and configured to generate heat when electricity flows in the heating wire.

18. The foldable display device of claim 17, wherein the heating wire has one of the following patterns: a zigzag pattern, a diagonal pattern and a circular pattern.

* * * * *